Feb. 15, 1966     R. CRAMER, JR     3,234,927
TORQUE CONTROL DEVICE FOR DIESEL ENGINES
Filed June 24, 1963     3 Sheets-Sheet 1

INVENTOR.
ROBERT CRAMER, JR.
BY
Andrus & Starke
ATTORNEYS

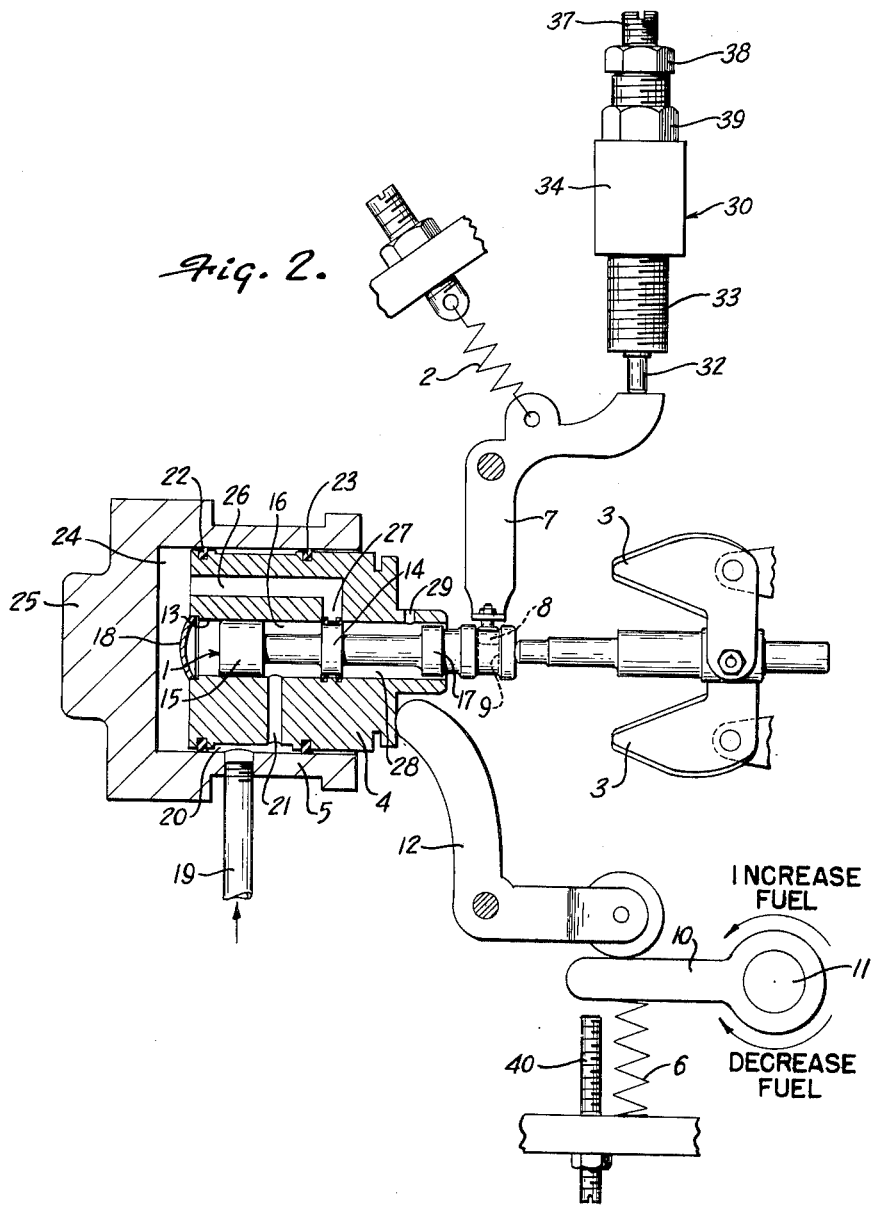

INVENTOR.
ROBERT CRAMER, JR.
BY
Andrus & Starke
ATTORNEYS

United States Patent Office 3,234,927
Patented Feb. 15, 1966

3,234,927
TORQUE CONTROL DEVICE FOR DIESEL
ENGINES
Robert Cramer, Jr., Hales Corners, Wis., assignor to Murphy Diesel Company, Milwaukee, Wis., a corporation of Delaware
Filed June 24, 1963, Ser. No. 289,826
12 Claims. (Cl. 123—140)

This invention relates to a torque control device for diesel engines whereby the air to fuel ratio is maintained more nearly constant during any sudden or rapid reduction in engine speed, to reduce the tendency to stall during a sudden increase in torque load, and to increase the efficient use of fuel at such times and eliminate the usual black smoke exhaust puff accompanying sudden torque changes.

The invention has been applied to governor controlled diesel engines since they present the problem by reason of the more sensitive fuel feed changes generally independent of the air supply. In turbo-charged governor controlled engines without the present invention, when the engine is operating at its rated speed and a sudden torque load is applied reducing its speed, the governor responds instantly to increase the fuel supply and bring the speed back up to normal, but the turbo-charger responds more slowly with the result that an insufficient supply of air is provided for the increased fuel.

By employment of the present invention the sudden spurt of increased fuel is prevented and a more gradual rate of fuel increase will obtain, corresponding more nearly to the increase in air supplied to the system by the turbo-charger.

In carrying out the invention a yieldable stop is disposed to oppose movement of the pilot valve by the governor spring when the fly-ball weights collapse inwardly from a sudden reduction in speed of the engine. The yieldable stop in effect changes the spring rate of the governor spring before the engine reaches the stall point and thereby alters the servo-hydraulic actuation of the fuel injection system to restrict the maximum fuel being injected into the cylinders of the engine per stroke.

While the yieldable stop may be solely spring supported, it is possible to employ a hydraulic dash pot system utilizing the engine lubricating oil pressure in place of or to supplement the return spring after a given movement of the pilot valve.

By providing an adjustment for the yieldable stop it is possible to change the stall point to a higher torque value and a lower speed so that the droop characteristic of the engine is greatly improved, giving the operator time to reduce the load and provide recovery in engine speed.

The invention may be better understood by reference to the accompanying drawings illustrating the best mode presently contemplated by the applicant of carrying out the invention.

In the drawings:

FIG. 2 is a schematic illustration of a conventional governor with servo-piston amplification and with the yieldable stop of the present invention;

Figure 1:
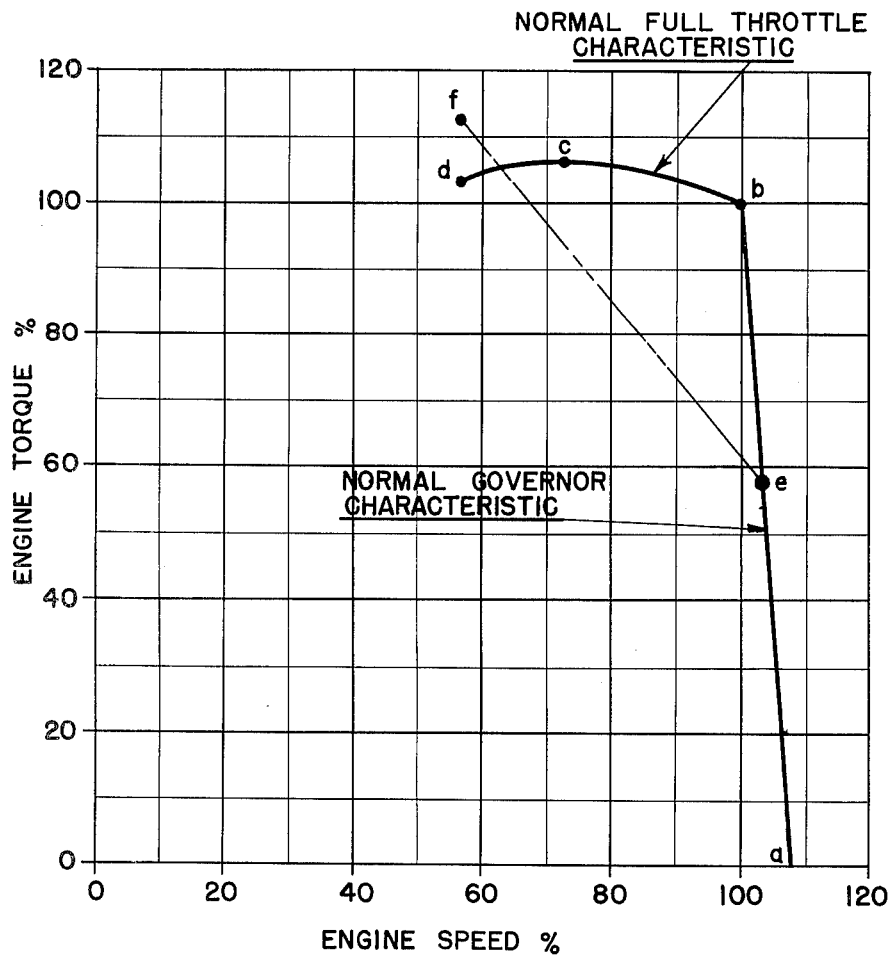
FIGURE 1 is a typical diesel engine torque curve with values expressed in percent and showing in broken line the corresponding curve when employing the present invention.

Referring to the graph of FIGURE 1, the horizontal abscissa represents the engine speed and is divided into percent from zero at no speed to 100% at full throttle speed under normal full load. The vertical ordinate represents the engine torque and is divided into percent from zero at no torque to 100% at normal full torque at full throttle.

Point ($a$) on the abscissa represents the point of governed no load speed for the engine and is shown to be at approximately 108% of the speed at full throttle and full load.

Point ($b$) on the graph represents the engine torque at governed speed with full throttle as with maximum fuel delivery. Point ($b$) is at the juncture of the vertical 100% speed line and the horizontal 100% torque line of the graph and is customarily preset by the manufacturer to prevent damage to the engine by high exhaust temperatures or high combustion pressures. At speeds above 100% the fuel delivered to the engine, and consequently the torque, is determined by the governor. At speeds below 100% the governor has reached the pre-set limit of its travel and the fuel delivered to the engine is determined by the characteristics of the fuel injection system as represented by curve $b$–$c$–$d$.

The line $a$–$b$ represents the normal governor characteristic and shows an increase in speed above the 100% value as the torque load is reduced to zero from the normal 100% value.

The curve $b$–$c$–$d$ represents the normal full throttle characteristic of the engine in torque as the engine speed is reduced by an excess load without the benefit of the present invention. Point ($c$) on this curve represents the maximum engine torque and occurs at a speed somewhat less than 75% of the normal full throttle speed. As the speed further reduces under load the engine torque drops and the engine may go into stall at approximately point ($d$) on the curve if the excess load is maintained.

The torque rise from point ($b$) to point ($c$) in diesel engines varies from 1% to 15%. The curve illustrated shows a rise of approximately 6% in torque from ($b$) to ($c$) with a reduction in engine speed of nearly 28%. If an engine is operating at rated torque ($b$) and a sudden excess load is applied, the engine will decrease in speed, and if the load exceeds the maximum torque ($c$) the engine may stall unless the operator can quickly reduce the load.

The employment of diesel engines to operate earth moving equipment encounters the problem of sudden stalling loads which require the operator to be constantly alert to reduce the load quickly as the engine speed starts to reduce. The smaller the torque rise from ($b$) to ($c$), the smaller the sudden load change to reach the stall point and the faster the operator must react to the speed drop which accompanies an increased load.

A sudden reduction in engine speed resulting from a sudden load increase rapidly increases the amount of fuel injected per stroke of each engine cylinder while the air input from the turbo-charger increases at a much slower rate, with the result that the increasing fuel to air ratio does not proportionately increase the engine torque and does not prevent stalling of the engine assuming the increased load is maintained. The time available before stalling is often too short for the operator to avoid the cause of the stalling.

The present invention adds a governor controlled range below the 100% speed value and which may extend down to approximately the stall speed value. Since at 100% speed the torque value does not reach point ($b$) and the governor limit is at a lower speed, the maximum amount of fuel to be delivered to the engine at the limit of the governor, as represented by point ($f$), can be substantially higher than indicated by line $b$–$c$–$d$, assuming that the engine can otherwise stand the higher fuel delivery at the lower speed.

Referring to FIG. 2 of the drawing the governor is schematically shown as comprising a pilot valve spool 1 axially shiftable in one direction by a governor spring 2 and in the opposite direction by the centrifugally actuated fly weights 3 mounted to rotate in direct proportion to the engine speed.

A servo piston 4 is hydraulically actuated in one direction by fluid pressure admitted to its cylinder 5 by the pilot spool 1. A return spring 6 effects actuation of pison 4 in the opposite direction.

The governor spring 2 acts through a pivoted lever 7 which has a knob 8 at its inner end riding in a recess 9 in the spool 1.

The return spring 6 acts against the fuel control lever 10 mounted on the fuel control shaft 11 to rotate the latter and thereby effect changes in the amount of fuel injected in each cylinder of the engine per stroke of the piston therein.

A bell crank lever 12 is actuated at one end by piston 4 and has its opposite end bear against lever 10 in opposition to spring 6.

The pilot spool 1 is disposed in an axial bore 13 in piston 4 and has a central flange 14 sealed against the walls of the bore. The spool 1 has an inner end head 15 which fits in bore 13 and provides a fluid transfer chamber 16 between flange 14 and head 15. A head 17 on the outer end of spool 1 fits loose in bore 13 and serves to guide the spool in its axial movement.

The inner end of bore 13 in piston 4 is closed by any suitable means, such as spring plate 18, and a suitable hole, not shown, is provided in piston 4 to relieve any pressure changes in the space between plate 18 and head 15.

Fluid pressure is supplied from a suitable source to chamber 16 at all times through conduit 19 opening through the side wall of cylinder 5 to a circumferential recess 20 in piston 4 and which in turn is connected by radial passage 21 to the chamber 16. The recess 20 is closed at its opposite ends by suitable packing or sealing rings 22 and 23 carried by piston 4 and bearing against the inner walls of cylinder 5.

Pressure fluid is transmitted from chamber 16 to the space 24 between the head 25 of cylinder 5 and the inner end of piston 4 through passage 26 in piston 4. The mouth 27 of passage 26 is disposed to be closed by flange 14 on pilot spool 1 when the engine speed is constant.

In the construction illustrated when the engine reduces in speed the fly weights 3 collapse inwardly permitting the governor spring 2 to move pilot spool 1 to the right, thereby opening a passage for fluid from the spool chamber 16 through passage 26 in piston 4 to the space 24 at the rear end of cylinder 5.

As the fluid enters space 24 it forces piston 4 outwardly and thereby actuates bell crank lever 12 to move the fuel control lever 10 against the return spring 6 and thereby rotate the fuel control shaft 11 in a direction increasing the amount of fuel injected per stroke of the engine.

When piston 4 has moved outwardly sufficient to close mouth 27 of passage 26 by flange 14, further movement is arrested and the fuel control shaft will remain at its new setting until further change is called for by fly weights 3.

When the load is decreased and the engine speeds up, the fly weights 3 move outwardly under centrifugal action and shift the pilot spool 1 inwardly against the action of governor spring 2, thereby connecting passage 26 to drain through spool chamber 28 and escape port 29 in piston 4, thereby permitting the return spring 6 to take over, moving lever 10 and shaft 11 in a direction decreasing the fuel intake and returning the piston 4 to the left in cylinder 5.

The servo system described above is only one of many different systems that might be employed to multiply the force output of the governor fly weight mechanism. Instead of hydraulic amplification for this purpose it is possible to employ pneumatic, electric or other amplifying means.

Figure 4:
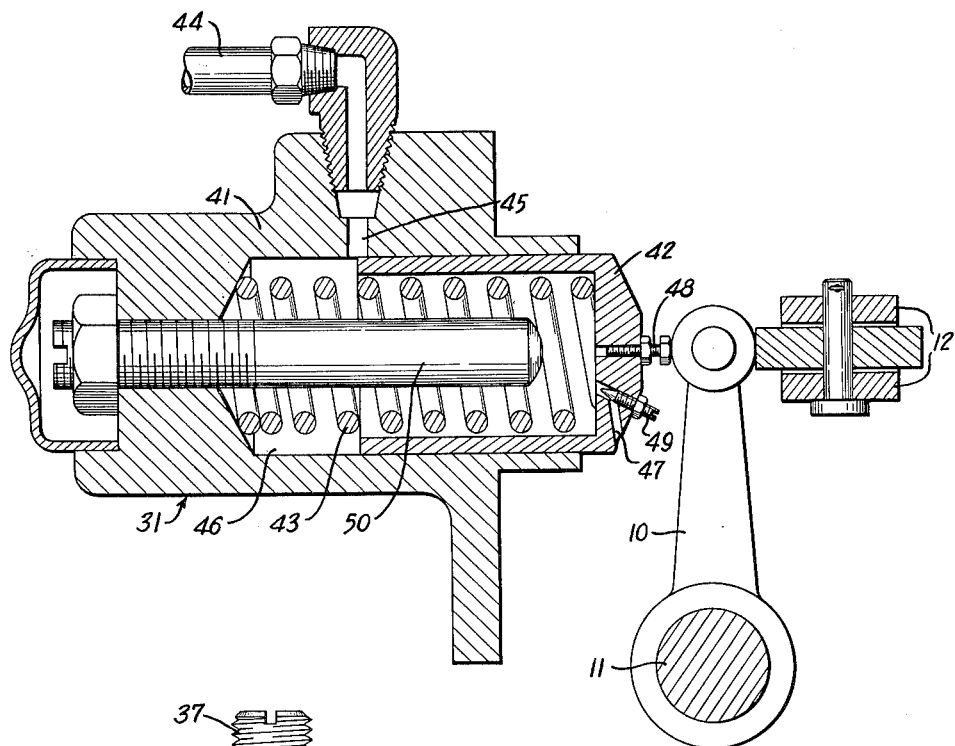
FIG. 4 is a detail view of a hydraulic cushion stop for carrying out the invention.

In carrying out the present invention a yieldable stop is provided to effect a lag or time delay in the increase in fuel called for by the governor in cases of rapid changes in load, as previously explained. This yieldable stop may be in the form of a spring pressed plunger unit 30 as illustrated in FIG. 3 and positioned as shown in FIG. 2 to function in opposition to governor spring 2, or it may be in the form of a hydraulic cushion unit 31 as illustrated in FIG. 4 and disposed in place of return spring 6 in FIG. 2.

Figure 3:
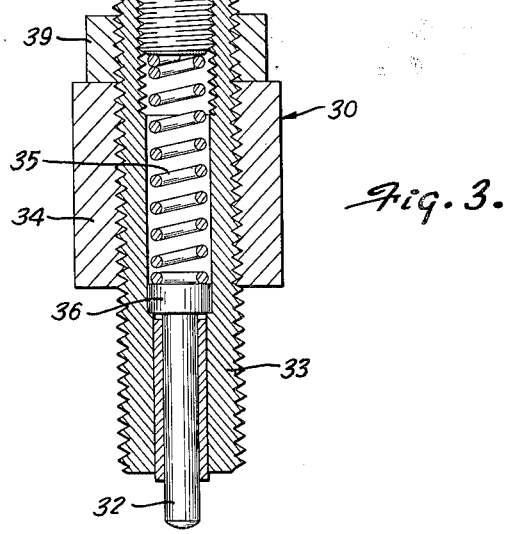
FIG. 3 is a detail longitudinal sectional view of a suitable yieldable stop.

The yieldable stop unit 30 illustrated in FIGS. 2 and 3 has its plunger 32 facing a part of the lever 7 and disposed to be engaged thereby when the pilot spool 1 shifts outwardly and actuates the lever 7 thereagainst in response to the tension in the governor spring 2.

The stop plunger 32 is carried by a cage assembly 33 providing for retraction of the plunger as lever 7 engages the tip of the plunger.

The cage assembly 33 comprises a hollow tubular structure adjustably carried in a fixed support 34 and having a coil spring 35 inside the same and disposed between the head 36 of the plunger and a screw 37 threaded into the upper end of the structure.

The screw 37 provides for pre-loading the spring 35 and is adjustable with the usual jam nut 38 securing the same in place.

The cage assembly 33 is threaded into support 34 and provided with a jam nut 39 securing the cage in place.

The adjustments provided by the yieldable stop illustrated in FIG. 3 determine the time when the lever 7 engages the plunger 32 and also the effective spring forces controlling the yielding of the plunger as the governor spring 2 forces the lever 7 thereagainst. In addition, the governor spring 2 is made adjustable to change the droop characteristic of the engine.

Referring to the graph of FIGURE 1, the effect of employing the yieldable stop of the present invention is illustrated in the broken line $e-f$.

Point ($a$) remains the same as previously described. Point ($e$) represents the torque value at which lever 7 engages the plunger 32. Thereafter the torque-speed relation moves along the sloping line $e-f$ due to a change in the overall spring rate of the governor by reason of the opposition between the governor spring 2 and the stop spring 35.

The point ($f$) is generally determined by the adjustable stop 40 disposed adjacent the return spring 6 and which limits the actuation of lever 10 in a direction increasing the fuel rate.

The effect of the sloping line characteristic illustrated by $e-f$ on the graph is to eliminate from consideration the rated torque maximum at ($b$) and to provide a new torque maximum at point ($f$) and which occurs at a lower speed so that the operator has a wider range of speeds in which to operate without stalling and in which the highest torque is obtained at the lowest speed. This greatly enhances the usefulness of the engine for earth moving equipment where sudden changes in load are encountered.

An alternative construction for the yieldable stop is illustrated in FIG. 4 where the hydraulic cushion unit 31 is disposed in place of the return spring 6 of FIG. 2.

In the construction of FIG. 4 the fuel control lever 10 is actuated in one direction by the bell crank lever 12 in response to the governor as shown in FIG. 2 and is actuated in the opposite direction by the unit 31 which provides a return force.

The unit 31 comprises a cylinder 41 closed at one end and having a piston 42 operable therein and generally closing the other end. The return spring 43, corresponding to spring 6 of FIG. 2, is disposed within cylinder 41 between the head closing the cylinder end and the piston 42.

The piston 42 engages the lever 10 in opposition to bell crank lever 12, and spring 43 serves as the return spring for levers 10 and 12 and the piston 4 of the governer.

A conduit 44 supplies liquid through inlet 45 in the side of the cylinder 41 to the chamber 46 within the cylinder. The chamber 46 is connected to the atmosphere through a suitable bleed hole 47 in the piston 42.

As the piston 42 is forced inwardly of cylinder 41 against spring 43 by the bell crank lever 12 of the governor, the liquid in chamber 46 escapes through hole 47 and also back through passage 45 and conduit 44 until the piston reaches a point where it passes and closes the inlet 45, after which the liquid confined in the chamber 46 provides a stop for further piston movement subject only to the restricted escape of liquid through the bleed hole 47.

In this embodiment of yieldable stop the hydraulic resistance to movement of piston 42 supplements the spring 43 and is in series with it, thereby providing in effect a different spring rate for controlling the fuel change called for by the governor.

When an increase in engine speed actuates the governor to decrease the fuel input to the engine, the spring 43 readily returns the piston 42 outwardly of the cylinder, and until inlet 45 is uncovered the bleed hole 47 lets air freely into the cylinder.

The point at which inlet 45 is closed corresponds to the point of engagement of lever 10 with plunger 32 in the first embodiment, and may be adjusted either by adjusting the support for cylinder 41 or by providing an adjustable stop 48 on the tip of piston 42 for engaging lever 10.

By providing an adjustable escape valve 49 in bleed hole 47, the resistance of the stop to yielding movement of the piston 42 can be varied, corresponding in general to the adjustment provided by screw 37 in the other embodiment of FIG. 3.

An adjustable rigid stop 50 is provided between the head of cylinder 41 and piston 42 to limit the inward movement of the piston and determine point (f) on the graph of FIG. 1. Stop 50 of this embodiment corresponds to stop 40 of the embodiment of FIGS. 2 and 3.

The stop embodiment of FIG. 3 incorporated as shown in FIG. 2 applies a lag in the shifting of the pilot spool 1 and thereby delays the sudden increase in fuel rate otherwise called for by the governor as the engine continues to reduce in speed. The stop embodiment of FIG. 4 incorporated in place of the return spring in FIG. 2 applies a time lag as a direct delay in actuation of the fuel control lever 10 when the sudden increase in fuel rate is otherwise called for by the governor.

The invention provides a change in the governor characteristics whereby a higher torque limit may be obtained, and a wider range of engine speed may be provided before reaching the torque limit, thereby making it easier for the operator to prevent stalling of the engine in operations where sudden heavy loads are encountered.

The invention is particularly important in the control of diesel engines employed in operating earth moving equipment where the engine speed is set at a predetermined maximum and the operator controls the earth moving operations without regard to any manual throttle control of the engine. The throttle control of the engine is effected automatically by a governor and turbocharger mechanism which attempts to maintain the engine speed constant in spite of variations in load. When the operator drives a power shovel, for instance, into abrupt engagement with the earth, the bite of the shovel effects a sudden load upon the engine which may reach a peak higher than the torque capacity of the engine, and the latter will stall unless the operator can react quickly enough to reduce the bite of the shovel at least momentarily. It is therefore important to increase the time delay of stalling to give the operator time to relieve the load.

Various modes of carrying out the invention are contemplated as being within the scope of the following claims particularly pointing out and distinctly claiming the subject matter which is regarded as the invention.

I claim:

1. In combination in a governor controlled diesel engine adapted to operate under near maximum speed and load conditions with the operator varying the load and the governor maintaining the speed, a flyweight governor having a spring opposing centrifugal expansion of the weights, yieldable stop means associated with the governor in opposition to said governor spring only in a predetermined low speed range of governor operation to retard rapid fuel increase by the governor in the event of sudden overload reducing the engine speed.

2. The construction of claim 1 in which said yieldable stop means is disposed to be operable only under peak over-load conditions and the governor operates free of said stop means in the normal range of applicable load variations.

3. The construction of claim 1 and means to vary the range of governor output movement in which said stop means operates.

4. The construction of claim 1 and means to vary the resistance to yielding movement of said stop means.

5. The construction of claim 1 in which the engine governor comprises a speed responsive pilot valve member operable in one direction by a governor spring having a substantially constant spring rate with centrifugal fly weights driven in accord with the engine speed to move said member in the opposite direction, and a servo piston operable in response to movement of said pilot valve member to control the rate of fuel feed to the engine, and in which said yieldable stop means comprises a cushion stop disposed to be engaged upon movement of said pilot valve member by said governor spring beyond a predetermined position and to effectively alter the spring rate and forces applicable to movement of said pilot valve member thereafter.

6. The construction of claim 5 and means to vary the position of engagement of said stop.

7. In combination in a governor controlled diesel engine adapted to operate under near maximum speed and load conditions with the operator varying the load and the governor trying to maintain the speed, an output member for the governor movable to selectively increase and decrease the fuel input rate for the engine in response to the governor, and yieldable stop means comprising a hydraulic dash-pot disposed to resist movement of said output member in a direction of substantial increase in fuel feed rate and operable only upon sudden peak overload conditions for the engine.

8. In combination in a governor controlled diesel engine adapted to operate under near maximum speed and load conditions with the operator varying the load and the governor trying to maintain the speed, an output member for the governor movable to selectively increase and decrease the fuel input rate for the engine in response to the governor, and yieldable stop means comprising a hydraulic dash-pot disposed to resist movement of said output member in a direction of substantial increase in fuel feed rate and operable only in a predetermined range of governor output movement.

9. In combination in a governor controlled diesel engine adapted to operate under near maximum speed and normal full load conditions with the operator varying the load and the governor maintaining the speed, an output member for the governor movable to selectively increase the fuel input rate for the engine in response to decreased engine speeds and to selectively decrease the fuel input rate for the engine in response to increased engine speeds, spring means having a substantially constant rate characteristic and biasing said output member in a direction to increase the rate of fuel input to the engine, and yieldable stop means opposed to said spring means to change the effective rate thereof in a predetermined portion of the control range approaching overload stall conditions for the engine.

10. The construction of claim 9 in which said yieldable stop means comprises a variable rate spring means and an adjustable positive stop associated therewith.

11. The construction of claim 9 in which said yieldable stop means comprises a hydraulic dashpot disposed to oppose an increase in the fuel input rate to the engine, and means to increase the resistance of said dashpot to said increase in fuel input rate in the range of operation approaching overload stall conditions for the engine.

12. The construction of claim 9 and means to remove said yieldable stop means from its effect upon the control of fuel input by the governor in all normal ranges of operation other than peak overload conditions.

References Cited by the Examiner

UNITED STATES PATENTS

| 2,107,070 | 2/1938 | Fleury | 123—140 X |
| 2,507,689 | 5/1950 | Buck et al. | 123—140 |
| 2,767,700 | 10/1956 | Parks | 123—140 |
| 2,879,754 | 3/1959 | Von Kienlin et al. | 123—140 |
| 2,986,291 | 5/1961 | Schick | 123—140 X |

MARK NEWMAN, *Primary Examiner.*

RICHARD B. WILKINSON, LAURENCE M. GOODRIDGE, *Examiners.*